United States Patent
Tanimoto (12)

(10) Patent No.: US 6,285,950 B1
(45) Date of Patent: Sep. 4, 2001

(54) VEHICLE NAVIGATION SYSTEM

(75) Inventor: Satoshi Tanimoto, Redondo Beach, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/311,330

(22) Filed: May 13, 1999

(51) Int. Cl.[7] .................................................. G01C 21/34
(52) U.S. Cl. ........................ 701/201; 701/204; 701/208; 340/994
(58) Field of Search ................................... 701/201, 208, 701/202, 204, 211; 340/992, 991, 994, 995

(56) References Cited

U.S. PATENT DOCUMENTS

| 4,153,874 | * | 5/1979  | Kaestner          | 324/161 |
|-----------|---|---------|-------------------|---------|
| 4,371,935 | * | 2/1983  | Yamaki            | 377/20  |
| 5,243,529 |   | 9/1993  | Kashiwazaki       | 701/208 |
| 5,365,449 |   | 11/1994 | Kashiwazaki       | 701/208 |
| 5,371,678 |   | 12/1994 | Nomura            | 701/210 |
| 5,541,845 | * | 7/1996  | Klein             | 701/207 |
| 5,568,390 | * | 10/1996 | Hirota et al.     | 701/207 |
| 5,689,252 | * | 11/1997 | Ayanoglu et al.   | 340/991 |
| 5,724,243 | * | 3/1998  | Westerlarge et al.| 701/204 |
| 5,787,383 | * | 7/1998  | Moroto et al.     | 701/210 |
| 5,928,308 | * | 7/1999  | Nanba et al.      | 701/211 |

* cited by examiner

*Primary Examiner*—Tan Nguyen
(74) *Attorney, Agent, or Firm*—Brinks, Hofer Gilson & Lione

(57) ABSTRACT

A vehicle navigation system estimates a travel time to a destination. Estimation of a travel time to a destination includes two steps of calculation. First, a travel time to an intermediate point forward of the present vehicle position is calculated based on the current average speed. Second, a travel time to the destination from the intermediate point is calculated based on the costs of road segments. A travel time to the destination from the present vehicle position is a sum of the travel time obtained by the first calculation and the travel time obtained by the second calculation. Since the current average speed reflects the road conditions to which the vehicle is presently subjected, the travel time to the intermediate point calculated with the current average speed is more accurate than a travel time that would be calculated by adding the costs between the present vehicle position and the intermediate position. As a result, a sum of the travel times obtained by the first calculation and the second calculation is more accurate than a travel time that is calculated by adding the costs throughout the road segments between the present vehicle position and the destination.

18 Claims, 3 Drawing Sheets

VEHICLE NAVIGATION SYSTEM

BACKGROUND OF THE INVENTION

This invention relates to a vehicle navigation system, and more particularly, to a vehicle navigation system having a function to calculate a travel time to a destination.

Such a navigation system has two main and interrelated functions: the first function is to display to the user a map of the present vehicle location; and the second function is to provide guidance on a guided route from a starting point to a destination. The second function is generally referred to as route guidance or selection. A route is typically optimized for one of various parameters, for instance, minimum travel time, minimum travel distance, maximum use of freeway, or other parameters pertaining to movement of a vehicle on a road network.

Another function of such a navigation system relating to the above two main functions is a function to calculate and display a travel time to a destination. Usually, a navigation system has map data and searches the data to determine an optimum route. The map data include travel times of all the road segments in an area encompassing a starting point and a destination point. These travel times are obtained, for example, by actually driving those road segments under various road conditions and averaging the actual travel times. The travel times may also be obtained, without actually traveling the road segments, by predicting travel speeds based on the road characteristics of the segments, such as a road width, road type, etc. The predicted travel speeds may be adjusted according to posted speed limits.

Conventionally, a travel time to a destination is calculated by adding these travel times in the map data along the road segments that are yet to be traveled along the optimum route. The problem with this conventional method of estimating a travel time to a destination is that the estimated travel time necessarily includes an error because the travel times in the map data do not accurately reflect the particular driving conditions to which the vehicle is actually subjected.

BRIEF SUMMARY OF THE INVENTION

The present invention provides a vehicle navigation system having an improved function to estimate a travel time to a destination. According to the present invention, estimation of a travel time to a destination includes two steps of calculation. First, a travel time to reach an intermediate point forward of the present vehicle position is calculated based on a current average speed. Second, a travel time to reach the destination from the intermediate point is calculated based on link costs. A travel time to reach the destination from the present vehicle position is a sum of the travel times obtained by the first calculation and the second calculation.

The intermediate point may be a next maneuver point or a point between the next maneuver point and the present vehicle position, or may be a point beyond the next maneuver point. At the first step, a travel time to reach the intermediate point is calculated by dividing a distance between the intermediate point and the present vehicle position by the current average speed. At the second step, using the conventional method, a travel time to reach the destination from the intermediate point is calculated by adding the link costs of the road segments between those two points.

Since the current average speed reflects the road conditions to which the vehicle is actually subjected, the travel time obtained by the first calculation should be more accurate than a travel time that could be calculated by adding the link costs between the intermediate point and the present vehicle point. As a result, a sum of the travel times obtained by the first calculation and the second calculation should be more accurate than a travel time that could be calculated by adding the link costs throughout the road segments that are yet to be traveled up to the destination.

DETAILED DESCRIPTION OF THE INVENTION

Figure 1:
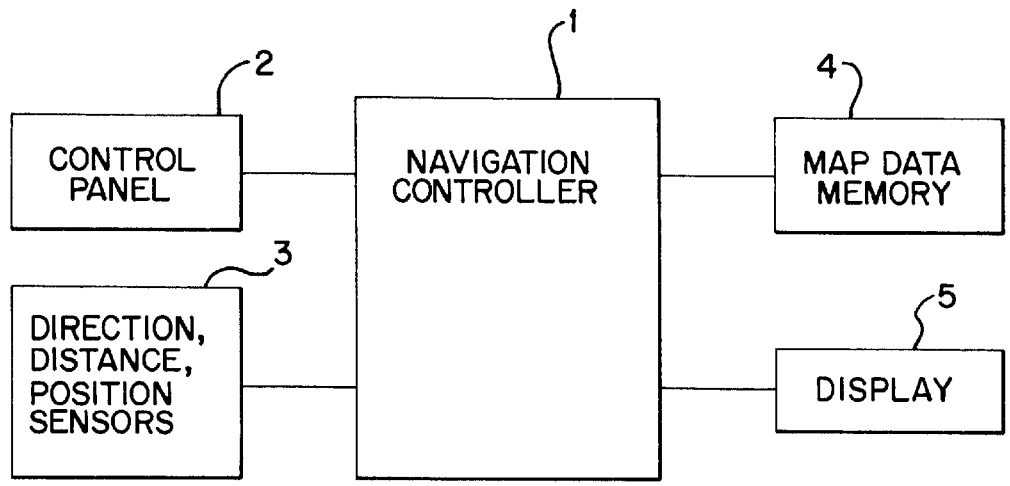
FIG. 1 shows a block diagram of a vehicle navigation system in accordance with this invention.

FIG. 1 illustrates a block diagram of a vehicle navigation system in accordance with this invention. The most important element of the navigation system is a navigation controller 1 that includes a microprocessor and associated circuitry. The navigation controller 1 receives instructions from a control panel 2. The control panel 2 includes a keyboard to be typed on by a user for various system control functions. The navigation controller 1 receives input signals from sensors 3 that include the vehicle speedometer and the odometer, a gyro, and a GPS (global positioning system) receiver for determining the vehicle travel direction, current position and a travel distance. The sensors 3 also includes means of determining a current average speed of the vehicle. A map data memory 4 is a hard disk, a CD-ROM or a DVD (digital video disk)-ROM that stores a set of map data for a particular area in which the vehicle is travelling. A display 5 is a small CRT or LCD that displays the present vehicle position and road guidance information. The display 5 may include an audible announcing capability.

Figure 2:
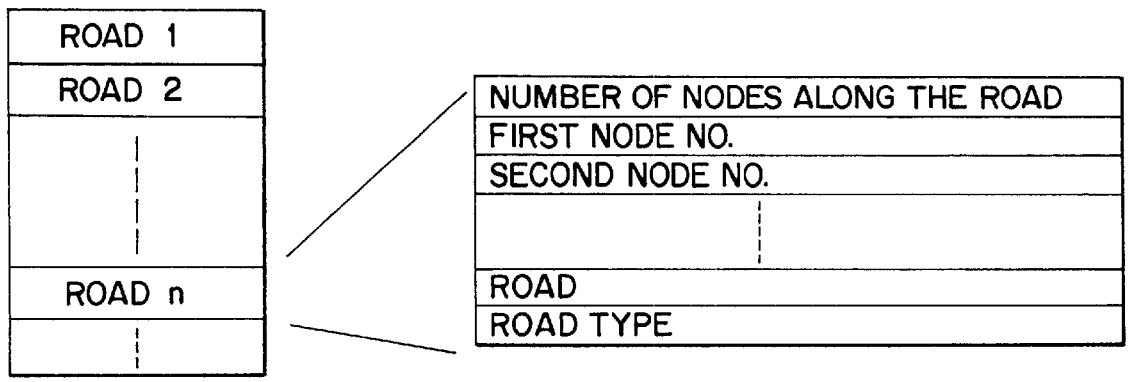
FIG. 2 shows a road data table.
Figure 3:
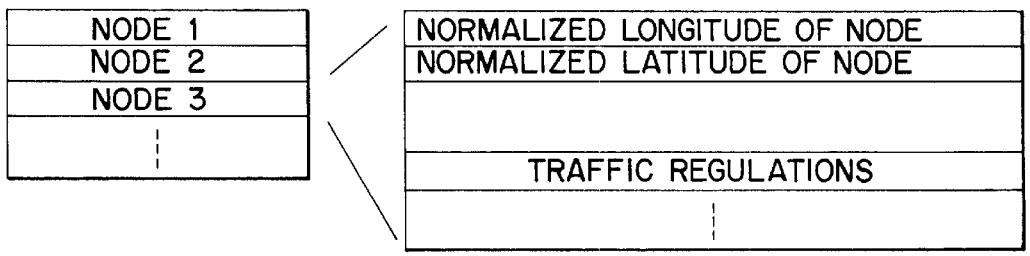
FIG. 3 shows a node data table.
Figure 4:
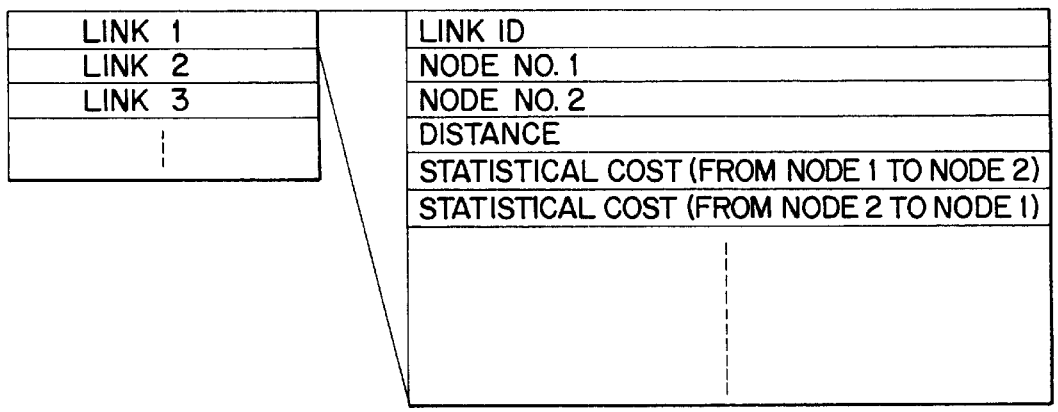
FIG. 4 shows a link data table.
Figure 5:
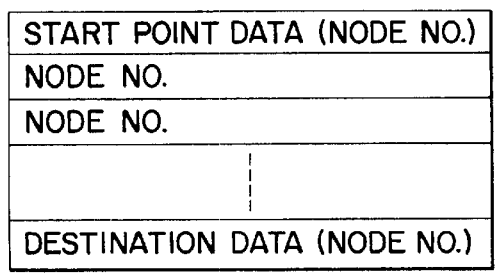
FIG. 5 shows an optimum route table.

In the map data, an intersection and a point where a road terminates are called a node, and a road segment connecting two adjacent nodes is called a link. Also, a time necessary to travel a certain distance is called a cost. Therefore, a cost of a link or a link cost means a time necessary to travel the link. Basically, the map data memory 4 stores three map data tables: (1) a road data table; (2) a node data table; and (3) a link data table. As shown in FIG. 2, the road data table indicates a set of nodes located along each road. As shown in FIG. 3, the node data table includes geographical information of each node, such as latitude and longitude of each node, and traffic regulation information of each node, such as a speed limit of each node. FIG. 4 shows the link data table that includes information regarding a distance and a cost of each link. Each link cost can be obtained, for example, by actually driving the link under various road conditions and averaging the travel times. The link costs may also be obtained by predicting travel speeds based on the road characteristics of the links, such as the road width, road type, etc. The predicted link costs may be adjusted according to the local speed limits, At the outset of travel, a user inputs a destination on the control panel 2. Initiated by the input of the destination, the navigation controller 1 obtains information on the present vehicle location from the sensors 3 and searches the map data memory 4 to determine the optimum route from the present vehicle location to the destination. It should be appreciated that this search operation for an optimum route is conventional and can be achieved by any conventional method, such as the Dijkstra method. After the search operation is completed, the navigation controller 1 has an optimum route table as shown in FIG. 5 that consists of a series of nodes located along the optimum route from the present vehicle position through the destination. The navigation controller 1 displays on the display 5 a map of the current vehicle location and guidance on the optimum route. Based on the nodes stored in the optimum route table, the navigation controller 1 then searches the link data table and adds the costs of the links along the optimum route. A sum of these link costs is displayed on the display 5 as an estimated travel time to the destination.

Figure 6:
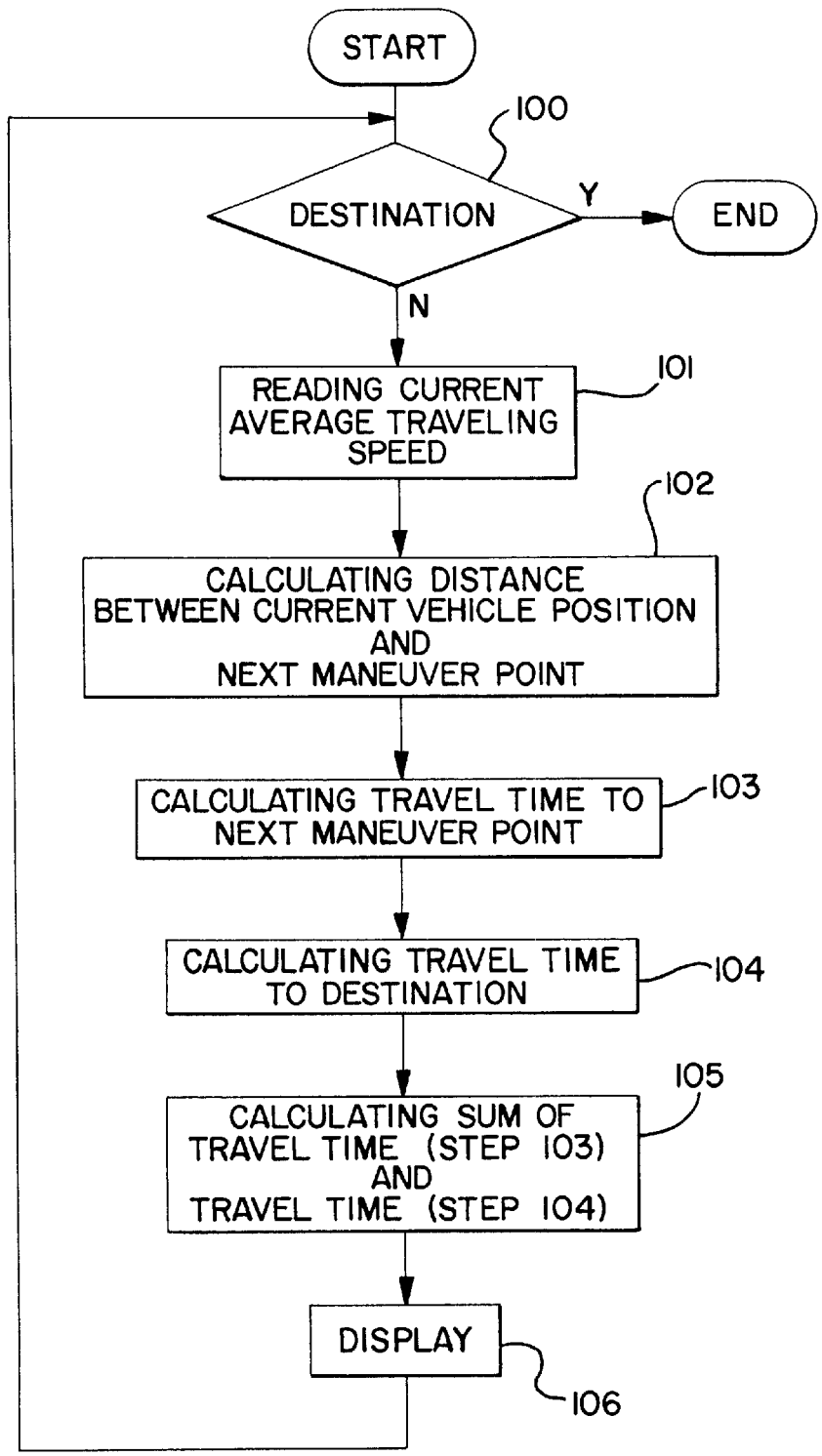
FIG. 6 is a flow chart showing an operation of calculating a travel time to a destination in accordance with this invention.

The driver then begins the travel to the destination, following the guidance instructions displayed on the display 5. Each time the vehicle passes a node, the navigation controller 1 calculates a travel time to the destination. FIG. 6 is a flow chart showing the operation of calculating a travel time to the destination. The navigation controller 1 first determines whether the vehicle has arrived at the destination (step 100). If it is determined that the vehicle has arrived at the destination, it will end the estimation operation. If it is determined that the vehicle has not yet arrived at the destination, the navigation controller 1 will calculate a travel time to a next maneuver point.

A maneuver point is defined as a point where road conditions so significantly change that the driver needs to be advised of the changes. The road conditions include a speed limit and a road width. An example of the maneuver point is a point where a vehicle changes from one road to another. Another example is a freeway interchange. At a freeway interchange, the driver does not change the road but needs to be advised of it. By constantly referring to the road data table, the navigation controller 1 can keep track of the road on which the vehicle is presently traveling and when the vehicle passes a maneuver point.

A vehicle speed is a function of the road conditions under which the vehicle is traveling. A vehicle speed changes as the road conditions change. But, as indicated by the definition of the maneuver point, the road conditions do not significantly change between two maneuver points. Therefore, it may be assumed that between two maneuver points, a vehicle speed does not significantly change and thus the average vehicle speed is constant. The present invention uses the current average vehicle speed to calculate a time to reach the next maneuver point from the present vehicle position.

At step 101 in FIG. 6, the navigation controller 1 reads a current average traveling speed of the vehicle from the sensors 3. At step 102 the navigation controller 1 calculates the distance between the present vehicle position and the next maneuver point. This is done by searching the link data table and adding the distances of the links between the present vehicle position and the next maneuver point. The navigation controller 1 then calculates a travel time to reach the next maneuver point (step 103) by dividing the distance obtained at step 102 by the current average speed obtained at step 101.

The navigation controller 1 then proceeds to step 104 where it calculates a travel time to reach the destination from the next maneuver point. At step 104 the navigation controller 1 searches the link data table and adds the costs of the links between the next maneuver point and the destination along the optimum route. At step 105 the navigator controller 1 adds the travel time to the next maneuver point calculated at step 103 and the travel time to the destination from the next maneuver point calculated at step 104. A sum of those travel times is displayed on the display 5 as a travel time to the destination (step 106). Lastly, the navigation controller 1 returns to step 100.

Thus, according to the present invention, estimation of a travel time to a destination includes two steps of calculation. First, the current average speed is used to calculate a travel time to reach an intermediate point forward of the present vehicle position. In the above-preferred embodiment, the intermediate point is a next maneuver point. Second, the link costs are used to calculate a travel time to reach the destination from the intermediate point. Since the current average speed reflects the road conditions under which the vehicle is presently traveling, the travel time to the intermediate point calculated with the current average speed is more accurate than a travel time that would be calculated by adding the costs of the links between the present vehicle position and the intermediate point. As a result, a sum of the travel times obtained by the first calculation and the second calculation should be more accurate than a travel time that would be obtained by adding the costs throughout the links between the present vehicle position and the destination.

It should be noted that some variations are possible in the above embodiment without departing from the gist of the present invention. One such variation is that the intermediate point may be a point beyond the next maneuver point if the road conditions of the subsequent roads are assumed to be the same as those of the road on which the vehicle is presently traveling. On the other hand, the intermediate point may be a point between the present vehicle position and the next maneuver point, for instance a point two or three kilometers ahead of the present vehicle position. This variation will improve the accuracy of estimation of a travel time when the vehicle is temporarily stuck in a traffic jam that is just few kilometers long. Another variation of the present invention is that the link costs in the map data may be personalized to individual drivers. Driving habits vary from one driver to another. The personalized map data will improve the accuracy of estimation of a travel time for a particular driver to whom the data is personalized.

It should be appreciated that the present invention may be embodied in computer software operating on a general purpose processor. While the present disclosure does not include the actual computer software code, such code can be written in light of the disclosure of the present invention by those skilled in the art. Alternatively, the present invention may be embodied in a special purpose processor, an application specific integrated circuit (ASIC) or some other combination of computer hardware and software. Further, the present disclosure is illustrative and not limiting. Modifications will be apparent to those skilled in the art in light of the disclosure and are intended to fall within the scope of the appended claims.

What is claimed is:

1. An on-board vehicle navigation system having a function of estimating a travel time for a vehicle to travel to a destination from a present vehicle position along a predetermined route, comprising on the vehicle:

a memory storing costs of road segments in an area including said present vehicle position and said destination;

a sensor for determining a current average travel speed of said vehicle;

means for calculating a first travel time to reach an intermediate point along the predetermined route from said present vehicle position based on said current average travel speed;

means for calculating a second travel time to reach said destination from said intermediate point based on said costs;

means for totaling said first and second travel times; and means for communicating the total travel time to a user of the vehicle.

2. A navigation system according to claim 1, wherein said intermediate point is a next maneuver point or a point between said next maneuver point and said present vehicle position.

3. A navigation system according to claim 1, wherein said intermediate point is a point beyond a next maneuver point.

4. A navigation system according to claim 1, wherein said first travel time is calculated by dividing a distance between said intermediate point and said present vehicle position by said current average traveling speed.

5. A navigation system according to claim 1, wherein said second travel time is calculated by adding said costs of said road segments between said intermediate point and said destination.

6. A navigation system according to claim 5, wherein said costs are personalized to individual drivers.

7. A navigation system according to claim 1, further comprising means for displaying a total of said first and second travel times.

8. An on-board navigation system capable of guiding a vehicle to a destination from a present vehicle position, comprising on the vehicle:

means for searching an optimum route and guiding said vehicle along said optimum route to said destination;

a memory storing costs of links along said optimum route;

a sensor for determining a current average traveling speed of said vehicle;

means for calculating a first travel time to reach an intermediate point on said optimum route from said present vehicle position based on said current traveling speed;

means for calculating a second travel time to reach said destination from said intermediate point based on said costs; and means for calculating and displaying a sum of said first and second travel times.

9. A navigation system according to claim 8, wherein said immediate point is a next maneuver point or a point between said next maneuver point and said present vehicle position.

10. A navigation system according to claim 8, wherein said intermediate point is a point on said optimum route beyond said next maneuver point.

11. A navigation system according to claim 8, wherein said first travel time is calculated by dividing a distance between said intermediate point and said present vehicle position by said current traveling speed.

12. A navigation system according to claim 8, wherein said second travel time is calculated by adding said costs of said links between said intermediate point and said destination.

13. A navigation system according to claim 8, wherein said costs are personalized to individual drivers.

14. In a vehicle navigation system, a method of estimating a travel time for a vehicle to travel to a destination from a present vehicle position along a predetermined route, comprising:

determining a current average traveling speed of said vehicle;

calculating a first travel time to reach an intermediate point along the predetermined route from said present vehicle position based on said current traveling speed;

calculating a second travel time to reach the destination from said intermediate point based on costs of road segments along the predetermined route between said destination and said intermediate point;

calculating a sum of said first and second travel times; and communicating the total travel time to a user of the vehicle, where the method is conducted on the vehicle.

15. A method according to claim 14, wherein said intermediate point is a next maneuver point or a point between said next maneuver point and said present vehicle position.

16. A method according to claim 14, wherein said intermediate point is a point beyond a next maneuver point.

17. A method according to claim 14, wherein said first travel time is calculated by dividing a distance between said intermediate point and said present vehicle position by said current traveling speed.

18. A method according to claim 14, wherein said second travel time is calculated by adding said costs of said road segments between said intermediate point and said destination.

* * * * *